(12) United States Patent
Nazarov et al.

(10) Patent No.: US 7,702,891 B1
(45) Date of Patent: Apr. 20, 2010

(54) STARTING-UP SOFTWARE MODULES FOR COMPUTING SYSTEMS

(75) Inventors: Michael Nazarov, Gostilitsy (RU);
Sergey Lunegov, Saint-Petersburg (RU);
Dmitri V. Chiriaev, Campbell, CA (US);
Anatoli Fomenko, Las Gatos, CA (US);
Prakash K. Narayan, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1249 days.

(21) Appl. No.: 11/228,738

(22) Filed: Sep. 16, 2005

(51) Int. Cl.
*G06F 9/445* (2006.01)

(52) U.S. Cl. .................. 713/1; 713/2; 713/100

(58) Field of Classification Search .............. 713/1, 713/2, 100
See application file for complete search history.

(56) References Cited

U.S. PATENT DOCUMENTS

| | | | |
|---|---|---|---|
| 6,584,560 B1 * | 6/2003 | Kroun et al. ................ | 713/2 |
| 6,842,856 B2 * | 1/2005 | Shenassa et al. ............. | 713/1 |
| 7,111,288 B2 * | 9/2006 | Aubertine .................. | 717/145 |
| 7,243,245 B2 * | 7/2007 | Pagan ...................... | 713/300 |
| 7,509,633 B2 * | 3/2009 | Nesbitt et al. .............. | 717/140 |
| 2005/0289513 A1 * | 12/2005 | Chen et al. ................. | 717/121 |

OTHER PUBLICATIONS

"Booting," Wikipedia, the free encyclopedia, http://en.wikipedia.org/wiki/Booting, 6 pages.

* cited by examiner

*Primary Examiner*—Nitin C Patel
(74) *Attorney, Agent, or Firm*—Dorsey & Whitney LLP

(57) ABSTRACT

Modules are started-up for a computing system based on start-up data. Start-up data can, for example, include a dependency-matrix indicating start-up dependencies of various modules. Start-up sequences can be determined based on the start-up data and a start-up sequence can be subsequently selected based on one or more criteria. The selected start-up sequence need not include all modules, yet it can list most modules that are likely to be used in or by a computing system. In addition, software (or application) start-up can be controlled based on various criteria. As a result, software start-up is performed more efficiently and more control over system start-up is exercised.

21 Claims, 6 Drawing Sheets

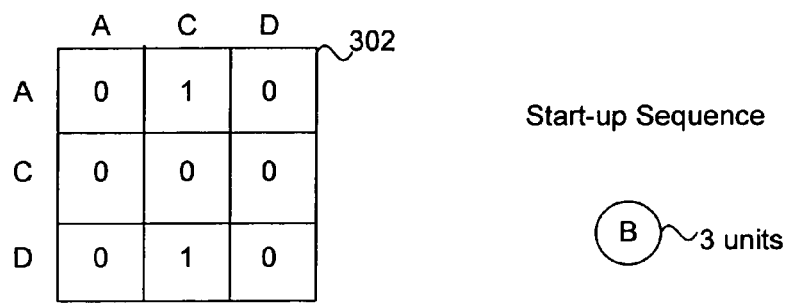
Fig. 3A
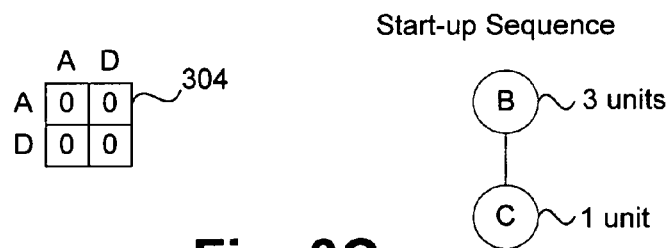
Fig. 3B
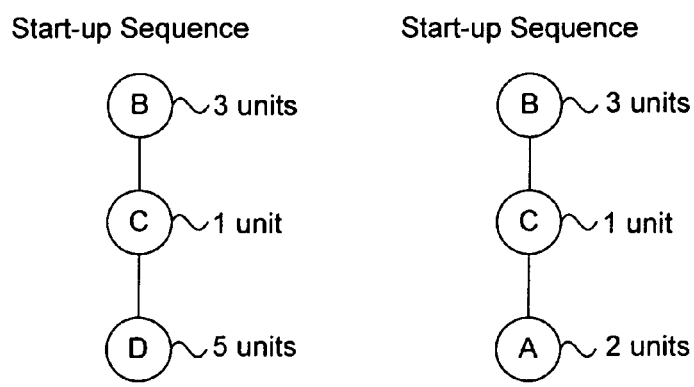
Fig. 3C
Fig. 3D

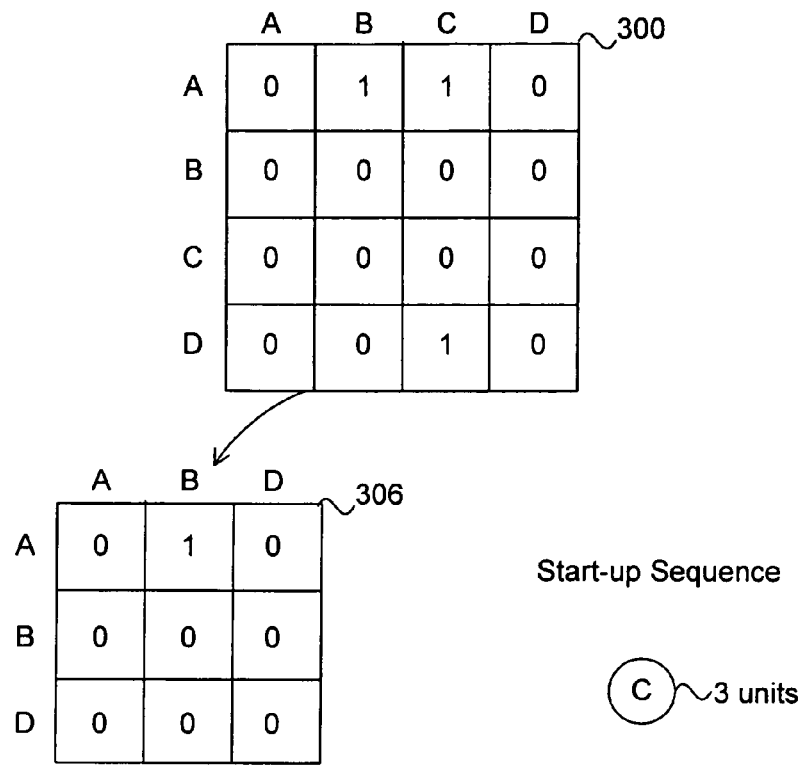
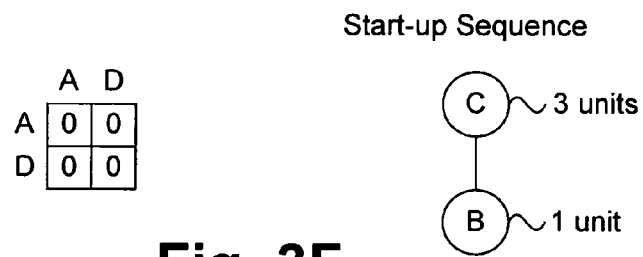
Fig. 3E
Fig. 3F
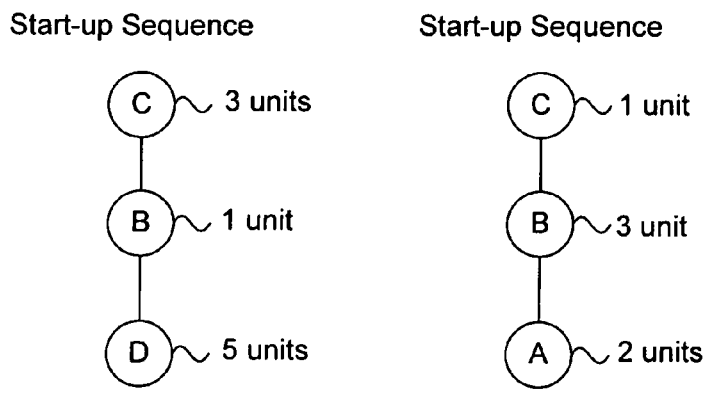
Fig. 3G

STARTING-UP SOFTWARE MODULES FOR COMPUTING SYSTEMS

BACKGROUND OF THE INVENTION

Typically, a computer program (e.g., an application) includes several components. One important component of computer programs is often referred to as a standalone module (or "module"). Modules are typically started-up (e.g., loaded and/or initialized) during a process known by those skilled in the art as "system start-up," "software start-up, or "application start-up." Some modern computing systems can include hundreds of modules (e.g., Java Studio Enterprise available from Sun Microsystems, Inc., Santa Clara, Calif.). Conventionally, all of the modules are started-up.

SUMMARY OF THE INVENTION

Broadly speaking, the invention pertains to techniques for starting-up modules for computing systems. In accordance with one aspect of the invention, start-up data that includes information about various modules of a computer system can be generated and stored in a computer readable medium. In one exemplary embodiment, start-up data includes a dependency-matrix that indicates start-up dependencies of various modules. The start-up dependencies include information about how the modules are interrelated with respect to the startup process (e.g., first module to be started-up before the second module, but after a third module).

Another aspect of the invention pertains to techniques for determining a plurality of potential start-up sequences based on start-up data which includes information about various modules, and subsequently selecting one of the potential start-up sequences as the start-up sequence to start-up modules for a computing system. In general, a start-up sequence can be selected from a plurality of potential start-up sequences based on at least one start-up criterion (e.g., maximum amount of start-up time for modules in a start-up sequence must not exceed a determined amount of time). In one exemplary embodiment, a Dependency-Matrix that indicates the start-up dependencies of various modules is used. The Dependency-Matrix is manipulated to determine various potential start-up sequences. A start-up sequence can be selected based on start-up times of modules and/or a target time for system (or software or application) start-up in accordance with one embodiment of the invention.

It will be appreciated that the selected start-up sequence need not include all modules, yet it can list most modules that are likely to be used in or by a computing system. In addition, software (or application) start-up can be controlled based on various criteria. As a result, software start-up is performed more efficiently and more control over system start-up is exercised.

However, it will be appreciated by those skilled in the art that the invention can be implemented in numerous ways, including as a method, an apparatus, a computer readable medium, a program, or computer system. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 3A-3G illustrate selection of a start-up sequence using a Dependency-Matrix in accordance with one embodiment of the invention.

DETAILED DESCRIPTION OF THE INVENTION

Figure 1:
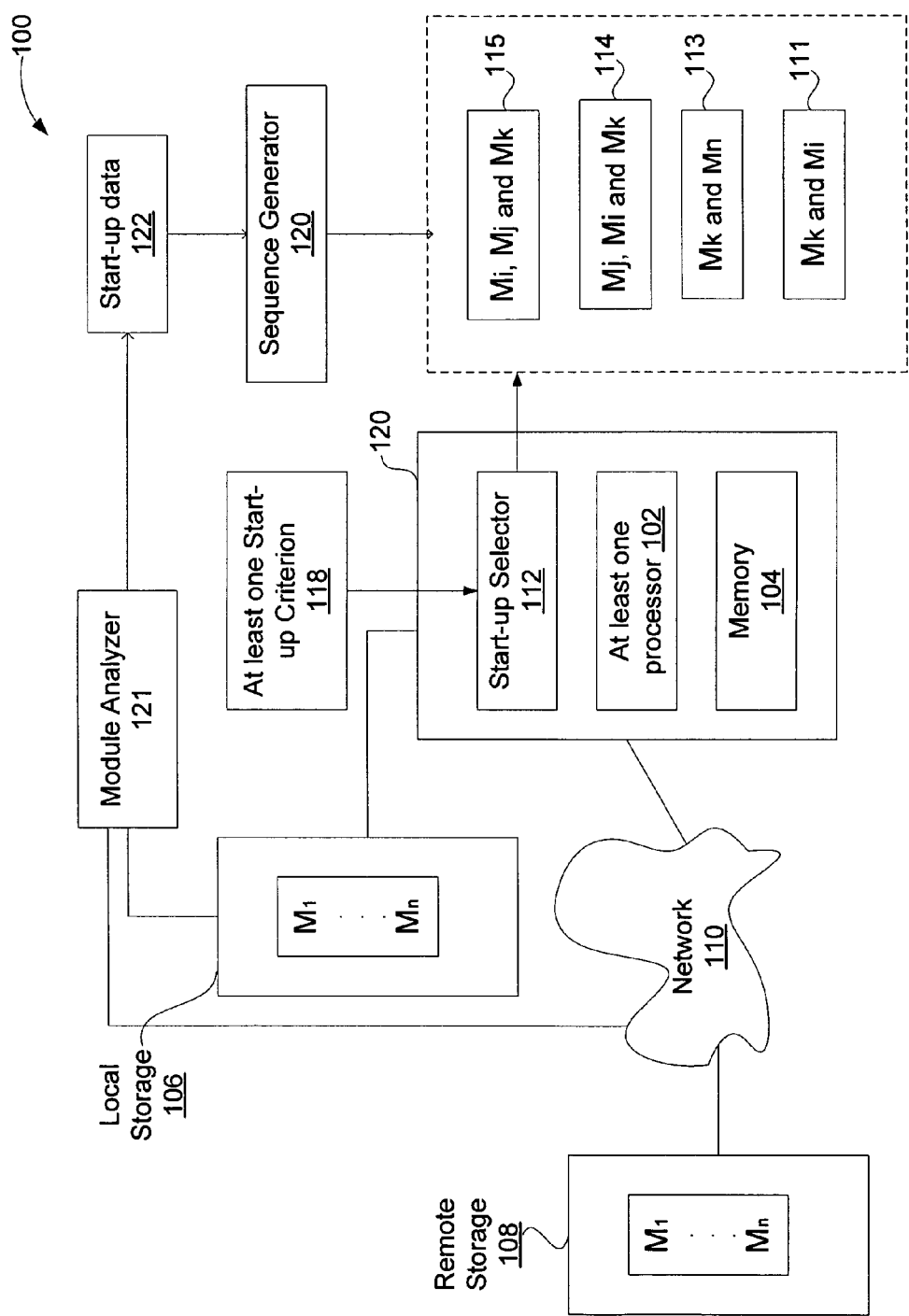
FIG. 1 depicts a computer system that is capable of determining a startup-sequence for starting-up various computer-software modules ("modules") in accordance with one embodiment of the invention.

As noted in the background of the invention, conventionally, all modules that can be used in computing system are "started-up" typically in a process known as the "system start-up," "software start-up," or "application start-up." Broadly speaking, "starting-up" a computer software module (or a "module") as used herein refers to the process of performing one or more operations before computer program code represented as the module is used, for example, by or in a computing system (e.g., personal computer, digital assistant, handheld device, smart card). As such, starting-up a module can, for example, include loading the module in a memory associated with a computing system and/or initializing the module, for example, to an initial state or one or more initial values before the module is used (e.g., computer program code of the module is executed to achieve a desired or programmed result).

Those skilled in the art will appreciate that some modules need to be started-up at every start-up process while others may be started-up only when required (e.g., on demand). In addition, some modules need to be or should be started-up after one or more other modules (e.g., a main module that should be started-up before other secondary modules). As the number and complexity of the modules in modern computing systems has increased, starting-up all of the modules has proved to be less effective partially because of the increasingly significant amount of time and resources required for system start-up. Furthermore, techniques that would allow more control over the started-up process would be highly useful, especially for computing systems that can include hundreds of modules and/or complex modules that require a significant time to start-up. Therefore, there is a need for alternative techniques for starting-up modules for computing systems.

Accordingly, the invention pertains to techniques for starting-up modules for computing systems. In accordance with one aspect of the invention, start-up data that includes information about various modules of a computer system can be generated and stored, for example, in a computer readable medium or transmitted by a carrier wave. In one exemplary embodiment, start-up data includes a dependency-matrix that indicates start-up dependencies of various modules. The start-up dependencies include information about how the modules are interrelated with respect to the start-up process (e.g., first module to be started-up before the second module but after a third module).

An other aspect of the invention pertain to techniques for determining a plurality of potential start-up sequences based on start-up data which includes information about various modules, and subsequently selecting one of the potential start-up sequences as the start-up sequence to start-up modules for a computing system. In general, a start-up sequence can be selected from a plurality of potential start-up sequences based on at least one start-up criterion (e.g., maximum amount of start-up time for modules in a start-up sequence must not exceed a determined amount of time). In one exemplary embodiment, a Dependency-Matrix that indicates the start-up dependencies of various modules is used. The Dependency-Matrix is manipulated to determine various potential start-up sequences. A start-up sequence can be selected based on start-up times of modules and/or a target time for system (or software or application) start-up in accordance with one embodiment of the invention.

It will be appreciated that the selected start-up sequence need not include all modules, yet it can list most modules that are likely to be used in or by a computing system. In addition, software (or application) start-up can be controlled based on various criteria. As a result, software start-up is performed more efficiently and more control over system start-up is exercised.

Embodiments of these aspects of the invention are discussed below with reference to FIGS. 1-4B. However, those skilled in the art will readily appreciate that the detailed description given herein with respect to these figures is for explanatory purposes as the invention extends beyond these limited embodiments.

FIG. 1 depicts a computer system 100 that is capable of determining a start-up sequence for starting-up various computer-software modules (modules) in accordance with one embodiment of the invention. As is known to those skilled in the art, typically a computer-software module (module) needs to be "started-up" before it can or should be used. Starting-up a module can, for example, include loading and/or initiating the module. In general, starting-up a module refers to the process of performing one or more operations before a module is used in a particular computer system. As such, starting-up a module can vary depending on the specification and/or requirement of a computer system.

As shown in FIG. 1, the computer system 100 includes at least one processor 102 and memory 104 (e.g., RAM memory). In addition, the computer system 100 can access a plurality of modules ($M_1, \ldots, M_n$) from a local storage 106 (e.g., hard drive) and/or from a remote storage 108 (e.g., memory associated with another computer) or a network 110. Moreover, a start-up sequence selector 112 can select a start-up sequence from a plurality of start-up sequences 111, 113, 114 and 115. The start-up sequence is selected based on at least one start-up criterion 118 (e.g., module start-up must be within a maximum allotted time, or select the maximum number of modules that can be started-up within a maximum allotted time for the start-up process).

It will be appreciated that the selected start-up sequence typically does not include all the modules ($M_1, \ldots, M_n$) and therefore can reduce the time and/or cost associated with starting-up all the modules ($M_1, \ldots, M_n$), but it can include most modules which are likely to be used.

As a result, the overall start-up time can be reduced while essentially all modules which are likely to be needed are started-up. For example, the overall start-up time for Java Studio Enterprise can be decreased by about 20%, but about 97% of modules which are likely to be needed can be started-up based on the selection made to the start-up selector 112.

It should be noted that the plurality of start-up sequences (111, 113, 114 and 115) is generated by the start-up generator 120, based on start-up data 122. As will be described below in greater detail, the start-up data 122 provides information about the modules ($M_1, \ldots, M_n$) that can be started-up in the computer system 100. Typically, the start-up data 122 includes information about how the modules ($M_1, \ldots, M_n$) are related to each other. The start-up data 122 can, for example, include a dependency matrix that provides information about the inter-dependency of modules with each other. The start-up data 122 can be generated by a module analyzer 121 and/or at least partially manually. It should be noted that the start-up generator 120 may be part of the computer system 100. In other words, start-up data may be generated or received by the computer system 100. As such, it is possible for the same computing system to generate the plurality of start-up sequences prior to selecting one based on the at least one criterion 118.

Figure 2:
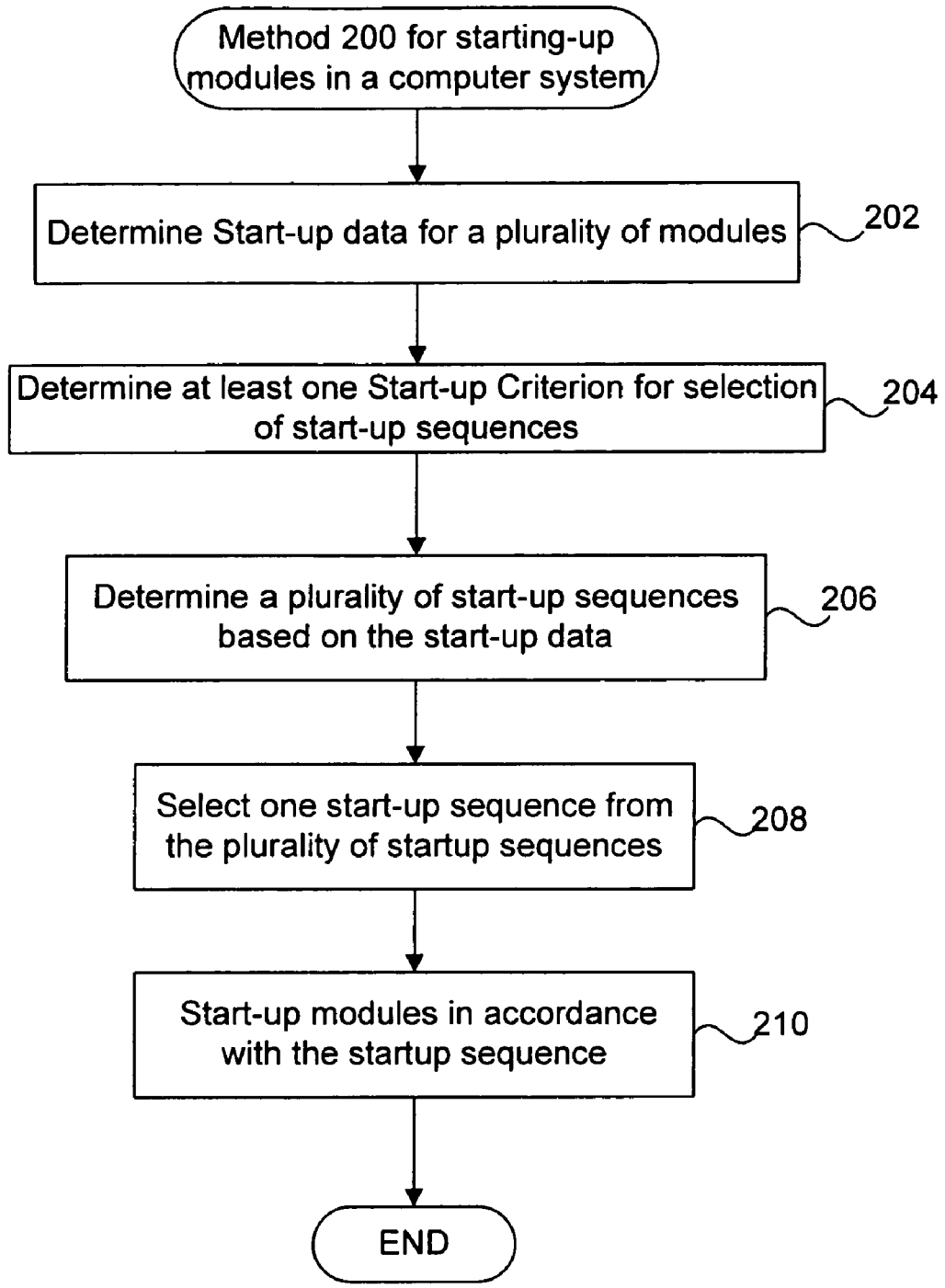
FIG. 2 depicts a method for starting-up a plurality of computer-software modules (or modules) in a computer system in accordance with one embodiment of the invention.

FIG. 2 depicts a starting-up method 200 for starting-up a plurality of computer-software modules (or modules) in a computer system in accordance with one embodiment of the invention. Initially, start-up data is determined (202) for a plurality of modules. The process of determining (202) of the start-up data is described in greater detail below. In addition to the start-up data, at least one criterion for selection of a start-up sequence is determined (204). Next, a plurality of start-up sequences is determined (206) based on the start-up data. Thereafter, a start-up sequence is selected (208) based on the at least one start-up criterion (204). Accordingly, the selected (208) start-up sequence is used to start-up (210) the modules in order specified by the start-up sequence. Typically, the selected start-up module does not include all the modules ($M_1, \ldots, M_n$), and therefore can reduce the time and/or cost associated with starting-up all the modules, but the selected start-up sequence can include most modules that are likely to be used, and as such, need to be started-up.

As noted above, start-up data used to generate a plurality of potential start-up sequence can include information about how the modules are interrelated with each other in accordance with one aspect of the invention. In one embodiment, start-up dependency-information that indicates the start-up dependency of modules on another module is provided describing how modules are interrelated. Start-up dependency of a first module on a second module can be defined as having to (or preferring to) start-up (and/or use) the second module before the first module is started-up (and/or used).

Referring now to FIG. 3A, a Dependency-Matrix 300 is depicted for modules A, B, C and D in accordance with one embodiment of the invention. As shown in FIG. 3A, each entry of the Dependency-Matrix 300 stores one of two values, namely, zero (or False), or one (or True). Generally, one in a $M_{IJ}$ entry indicates that module I is dependent on module J. For example, the entry MAC is set to one (1) to indicate that module A is dependent on module C, and so on. A zero (or False) in a $M_{IJ}$ entry, however, indicates that module I is not dependent on module J.

It should be noted that a row of all zeros indicates that a module (e.g., B or C) is not dependent on any other module. Also the number of ones in a column indicates the number of other modules which depend on a module (e.g., two modules depend on B module C, one module depends on B, and no modules depend on A and D). It will be appreciated that using the Dependency-Matrix 300, a number of potential start-up sequences can be determined. The process of determining start-up sequences based on the Dependency-Matrix 300 is depicted below in accordance with one embodiment of the invention.

Initially, rows with only zero values (i.e., no ones) are selected. In this case, referring to FIG. 3A, both rows B and C qualify because their rows have only zero values (i.e., no one), and can be considered. Initially, Row B can, for example, be selected. As a result, Dependency-Matrix 300 is altered by extracting Row B and Column B. Referring now to FIG. 3B, the resulting Dependency-Matrix 302 is depicted. It should be noted that the start-up time (e.g., 3 units of time) for module B can also be known and stored. Generally, the start-up time for a module (e.g., module B) indicates the time required to start-up (e.g., load and/or initialize) that module. Continuing with selection of the next row with only zeros (i.e., no ones), module C can be subsequently selected. The resulting Dependency-Matrix 304 is depicted in FIG. 3C. FIG. 3D depicts the start-up sequences (B-C-D) and (B-C-A) as two potential start-up sequences that can be determined based on the Dependency-Matrix 300 (shown in FIG. 3A). Continuing with selection of the next row with only zeros (i.e., no ones), Module C can be subsequently selected. The resulting Dependency-Matrix 304 is depicted in FIG. 3C. FIG. 3D depicts the start-up sequences (B-C-D) and (B-C-A) as two potential start-up sequences that can be determined based on the Dependency-Matrix 300 (shown in FIG. 3A).

As noted above, a start-up sequence can be selected based on a start-up criterion. By way of example, the start-up criterion can be: choose a sequence that has as many modules as possible while keeping the total start-up to be no more than 6 units of time. In this example, the start-up sequence (B-C-D) would require 9 units of time, and the start-up sequence (B-C-A) would require 6 units of time. As such, the start-up sequence (B-C-A) would be selected based on the selection-criterion noted above. It should also be noted that the start-up sequence (B-C-A) is also more preferred than the start-up sequences (B-C), (B), or (C) because it would start more modules (i.e., three (3) modules instead of two (2) or just one (1).

Referring back to FIG. 3A, if module C is initially selected instead of module B, the Dependency-Matrix would be altered by removing Row C and Column C. The resulting Dependency-Matrix is depicted in FIG. 3E as Dependency-Matrix 306. Next, module B or D can be selected. If module B is selected, the row and column associated with module B can be removed from the Dependency Matrix 306. The resulting dependency-Matrix is depicted in FIG. 3F (for brevity, resulting matrix and start-up sequences for selection of module D is not shown or described). FIG. 3G depicts the resulting start-up sequences, namely, (C-B-D) and (C-B-A). The total start-up time required for the start-up sequence (C-B-D) would be 9 units of time. Therefore, the start-up sequence (C-B-D) would not be selected over the start-up sequence (B-C-A). As a result, either the start-up sequence (B-C-A) or (C-B-A) may be selected, and so on. The start-up sequence (B-C-A) may, for example, be ultimately chosen because it was determined before (C-B-A), or another start-up criterion can indicate that if total start-up time is equal, it is preferred to start-up module C before module B. As such, the start-up sequence (C-B-A) may ultimately be chosen.

In any case, those skilled in the art will appreciate that a variety of different programming concepts, data structure, and/or objects may be used to implement a Dependency-Matrix. Furthermore, it is possible to use various methods, functions or procedures to implement a process for determining a start-up sequence based on a matrix or other data structures and/or objects that can store information about a plurality of modules that can be started-up. An exemplary method for determining a start-up sequence is described below (FIG. 4B).

Figure 4A:
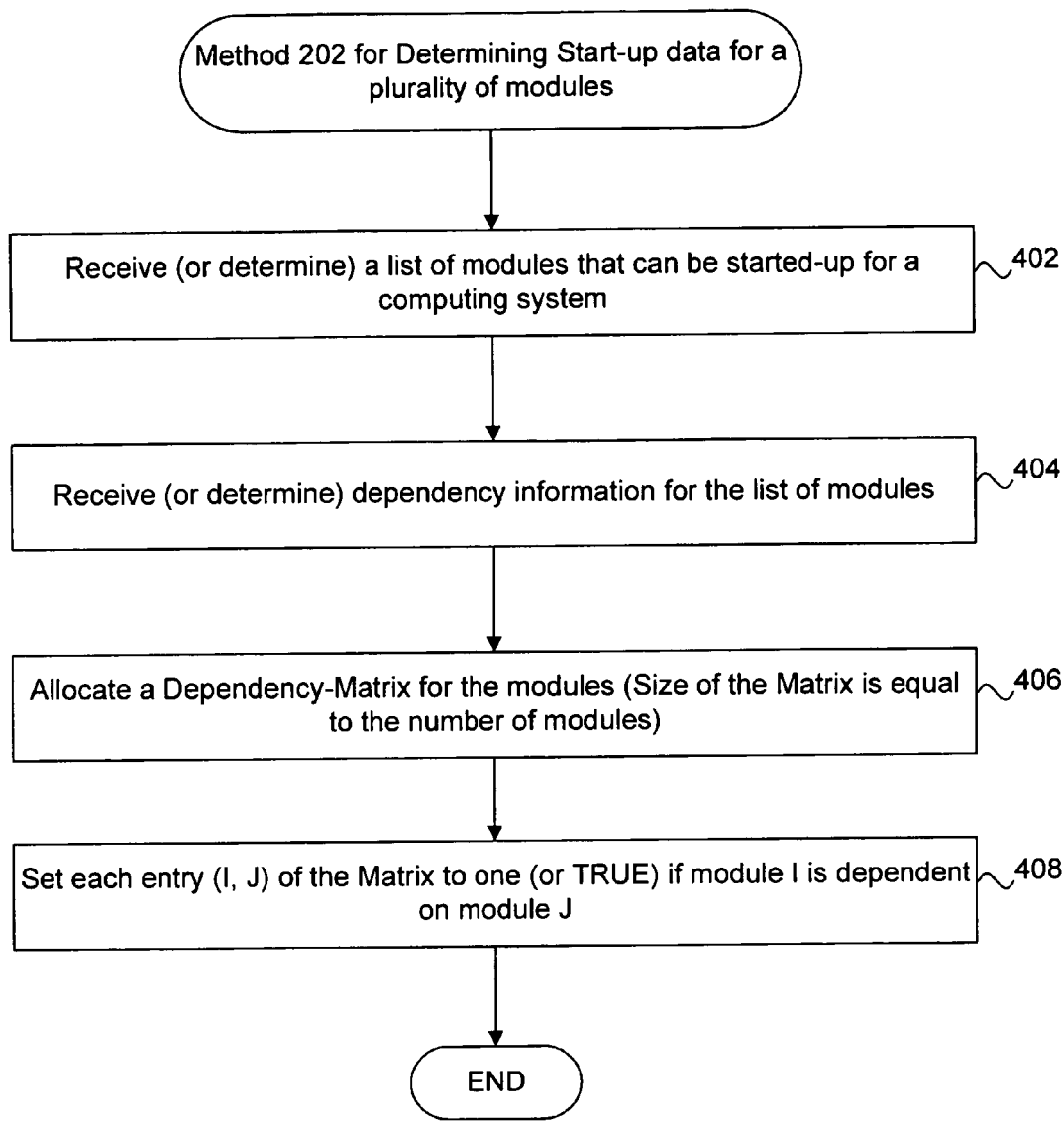
FIG. 4A depicts in greater detail a method for starting-up data in accordance with one embodiment of the invention.

However, referring now to FIG. 4A, a method 202 for starting-up data is depicted in greater detail in accordance with one embodiment of the invention. Initially, a list of modules that can be started-up for a computer system is received or determined (402). Next, dependency-information for the modules is received or determined (404). Thereafter, a Dependency-Matrix is allocated (406) for the modules. The size of the Dependency-Matrix is determined based on the number of modules. Those skilled in the art will appreciate that a Dependency-Matrix can be implemented using a variety of programming concepts such as, for example, include, two-dimensional arrays. Also, the Dependency-Matrix may be initialized to zero or another predetermined value (i.e., all entries of the matrix can be initialized). After allocation and initialization (404), each entry $M_{I,J}$ of the Dependency-Matrix is set to one (or another predetermined value) if a module I is dependent on a module J (i.e., there is a requirement and/or preference that module J be started up before module I is started-up).

Figure 4B:
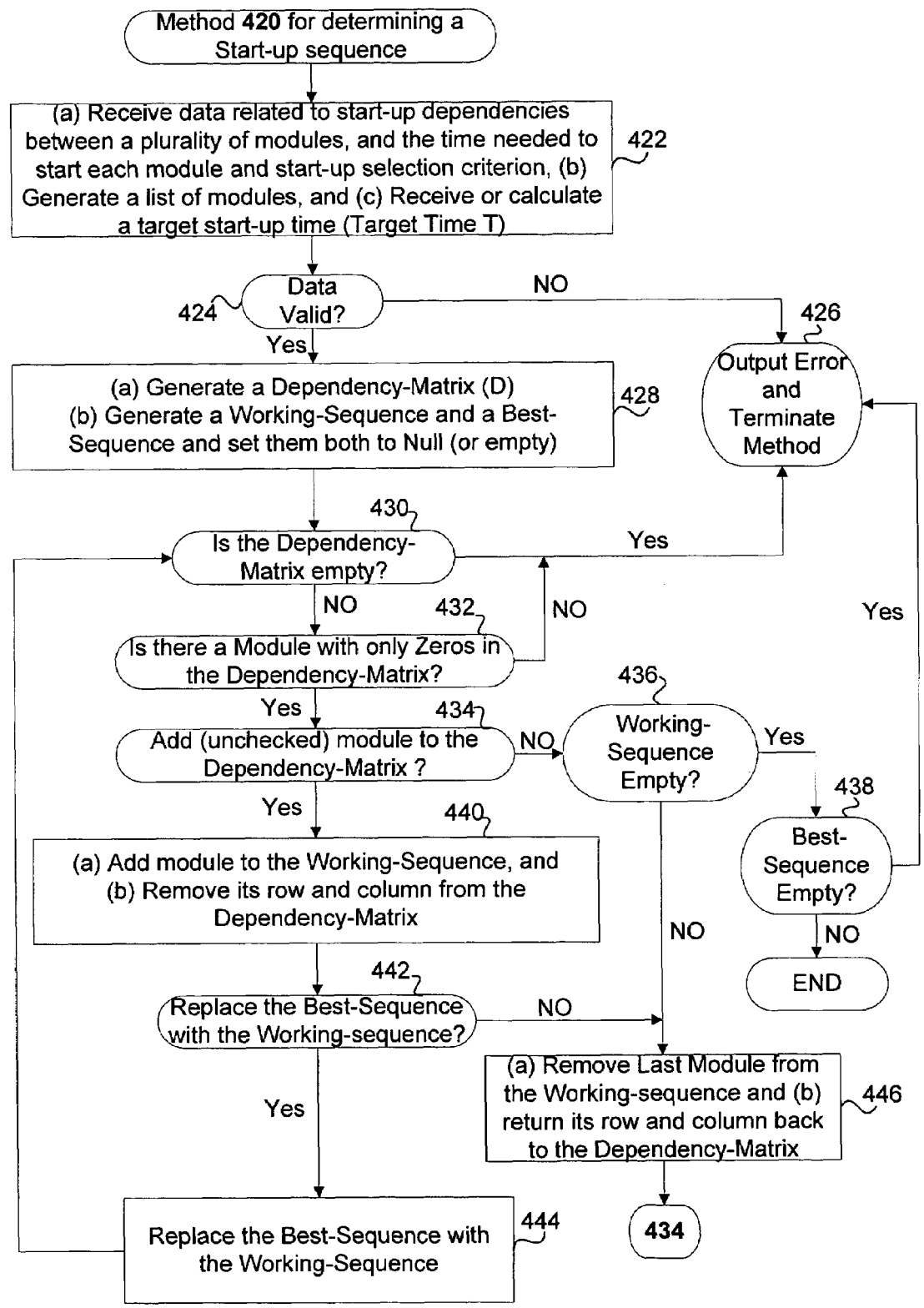
FIG. 4B depicts a method for determining a start-up sequence using a Dependency-Matrix and a target-startup-criterion in accordance with one embodiment of the invention.

FIG. 4B depicts a method 420 for determining a start-up sequence using a Dependency-Matrix and a target start-up criterion in accordance with one embodiment of the invention. Initially, data related to start-up dependencies between modules, the time needed to start-up each module, and start-up selection criterion is received (422a). In addition, a list of modules may be generated (422b) and a target start-up criterion (or Target Time T) can be received or calculated (422c). Next, the validity of data is determined (424) and an error can be output (426) accordingly. If it is determined (424) that the data is valid, a Dependency-Matrix (D) is generated (428a), and a best-sequence and a working-sequence (e.g., object, variable, or data structures) are also created and set to zero (428b). The Dependency-Matrix (D) can, for example, be generated as described above (FIG. 4A). Next, it is determined (430) if the Dependency-Matrix is empty and an error can be output (426) if it is determined (430) that the Dependency-Matrix is empty. However, if it is determined (430) that the Dependency-Matrix is not empty, it is determined (432) whether there is a row of all zeros in the Dependency-Matrix. Subsequently, an error is output (426) if it is determined (432) that there are no rows with all zeros.

On the other hand, if it is determined (434) that there is a row of all zeros (i.e., there is module with an associated row of only zeros), it is determined (434) whether a module associated with a row of all zeros can be added to the working-sequence. This determination (434) can be made based on determining whether the module has been considered in the working-sequence. As such, if it is determined (434) that the module associated with a row of all zeros cannot be added to the working-sequence, it is determined (436 and 438) whether the working-sequence and the best-sequence are both empty and an error can be output (426) accordingly.

If it is determined (432) that a module associated with a row of all zeros in the Dependency-Matrix (D) can be added to the working-sequence, the module is added (440a) to the working-sequence and the row and column associated with the module is removed (440b) from the Dependency-Matrix (D). Next, it can be determined (442) whether to replace the working-sequence by the best-sequence. This determination (442) can be made based on at least one criterion (e.g., which sequence has more modules that can be started-up within the Target Time T). If it is determined (442) to replace the working-sequence with the best-sequence, the best-sequence is replaced (444) by the working-sequence and the working-sequence can optionally be displayed. Next, it is determined (430) whether the Dependency-Matrix is empty and the method 400 proceeds in a similar manner as described above.

However, if it is determined (442) not to replace the best-sequence by the working-sequence, last module added is removed (446a) from the working-sequence, and additionally the row and column associated with the module is returned (446b) to the Dependency-Matrix (D). Thereafter, it is determined (434) whether there is a module that can be added to the working-sequence and the method 400 proceeds in a similar manner as described above. The method 400 ends when it is determined (438) that the best-sequence is not empty. Consequently, the best-sequence can be determined as the start-up sequence.

The many features and advantages of the present invention are apparent from the written description, and thus, it is intended by the appended claims to cover all such features and advantages of the invention. Further, since numerous modifications and changes will readily occur to those skilled.

What is claimed is:

1. A method of initiating start-up for a computing system, comprising:
   receiving start-up data at a start-up generator running on a processor of a computing system, the start-up data being for a plurality of computer-software modules tangibly stored in a computer readable storage medium of the computer system, wherein during a start-up process for said computing system, the computer-software modules can be started-up by being loaded from the storage medium into a memory device from which the computer-software modules are executable by the processor;
   receiving start-up times for said plurality of modules at the start-up generator running on the processor;
   determining a plurality of start-up sequences by the start-up generator running on the processor for said plurality of computer-software modules;
   determining total start-up time by the start-up generator running on the processor for said plurality of start-up sequences; and
   selecting from said plurality of start-up sequences by a start-up sequence selector running on the processor, based on a start-up criteria, a first start-up sequence.

2. A method as recited in claim 1, further comprising: starting-up a plurality of modules based on said first start-up sequence.

3. A method as recited in claim 1, wherein
   said startup-criteria is a maximum number of modules that can be started-up within a maximum allotted time for the start-up process.

4. A method as recited in claim 1, wherein said start-up data further comprises module-relation-information that includes information about said plurality of modules.

5. A method as recited in claim 4, wherein said module-relation-information includes dependency information that provides information about the interdependencies of said plurality of modules with respect to said start-up process.

6. A method as recited in claim 5, wherein said module-relation-information includes a Dependency-Matrix for said plurality of modules.

7. A method as recited in claim 6, wherein said method further comprises:
   setting each entry of said Dependency-Matrix to a first predetermined value if the module associated with the row of said entry is dependent on the module associated with the column of said entry; and
   setting each entry of said Dependency-Matrix to a second predetermined value if the module associated with the row of said entry is not dependent on the module associated with the column of said entry.

8. A method as recited in claim 7, wherein said method further comprises:
   determining whether a first row associated with a first module in said Dependency-Matrix does not have any entry that is set to said first value; and
   removing said first row and a first column associated with said first module from said Dependency-Matrix when said determining determines that said row associated with said first module in said Dependency-Matrix does not have any entry that is set to said first value.

9. A method as recited in claim 8, wherein said method further comprises:
   repeating, said determining of whether a row in said Dependency-Matrix does not have any entry that is set to said first value, for a second module; and
   removing a second row and a second column associated with said second module from said Dependency-Matrix when said determining determines that said second row associated with said second module in said Dependency-Matrix does not have any entry that is set to said first value.

10. A method as recited in claim 1, wherein said start-up criteria is a maximum time allotted for the total start-up time.

11. The method as recited in claim 1, further comprising:
    receiving, by a module analyzer running on the processor, a list of modules that can be started-up for a computing system during a start-up process;
    generating start-up data for said plurality of computer-software modules by the module analyzer running on the processor, wherein said start-up data includes module-relation-information that provides information about how said plurality of modules are related; and
    storing, by a module analyzer running on the processor, said start-up data in the computer-readable medium for use by the start-up generator running on the processor.

12. A computing system that operates to:
    receive start-up data for a plurality of computer-software modules that can be started-up for said computing system during a system start-up process for said computing system;
    receive start-up times for said plurality of modules;
    determine a plurality of start-up sequences for said plurality of computer-software modules;
    determine total start-up time for said plurality of start-up sequences; and
    select from said plurality of start-up sequences, based on a start-up criteria, a first start-up sequence.

13. A computing system as recited in claim 12, wherein said computing system further operated to:
    start-up a plurality of modules based on said first start-up sequence; and
    wherein said start-up criteria is a maximum number of modules that can be started-up within a maximum allotted time for the start-up process.

14. A computing system as recited in claim 12, wherein said start-up data further includes module-relation-information that includes information about said plurality of modules.

15. A computing system as recited in claim 14, wherein said module-relation-information includes dependency information that provides information about the interdependencies of said plurality of modules with respect to said system start-up process.

16. A computing system as recited in claim 15, wherein said module-relation-information includes a Dependency-Matrix for said plurality of modules.

17. A computing system as recited in claim 12, wherein said start-up criteria is a maximum time allotted for the total start-up time.

18. A computer system comprising:
- a computer-readable storage medium having a plurality computer software modules;
- a memory in communication with the computer-readable storage medium, wherein the computer-software modules can be started-up during a start-up process by being loaded from the storage medium into the memory;
- a processor in communication with the memory operable to execute the computer-software modules from the memory, the processor additionally executing:
- computer program code for receiving start-up data for the plurality of computer-software modules;
- computer code for receiving start-up times for said plurality of modules;
- computer program code for determining a plurality of start-up sequences for said plurality of computer-software modules;
- computer code for determining total start-up time for said plurality of start-up sequences; and
- computer program code for selecting from said plurality of start-up sequences, based on a start-up criteria, a first start-up sequence.

19. A computer system as recited in claim 18, further comprising:
- computer program code for starting-up a plurality of modules based on said first start-up sequence; and
- computer program code for receiving or determining said startup-criteria.

20. A computer system as recited in claim 18, wherein said start-up data further includes module-relation-information that includes information about said plurality of modules, and wherein said module-relation-information includes dependency information that provides information about the interdependencies of said plurality of modules with respect to said system start-up process.

21. A computer system as recited in claim 20, wherein said module-relation-information includes a Dependency-Matrix for said plurality of modules.

* * * * *

UNITED STATES PATENT AND TRADEMARK OFFICE
CERTIFICATE OF CORRECTION

| | | |
|---|---|---|
| PATENT NO. | : 7,702,891 B1 | Page 1 of 1 |
| APPLICATION NO. | : 11/228738 | |
| DATED | : April 20, 2010 | |
| INVENTOR(S) | : Michael Nazarov et al. | |

It is certified that error appears in the above-identified patent and that said Letters Patent is hereby corrected as shown below:

In column 4, line 53, delete "MAC" and insert -- $M_{AC}$ --, therefor.

In column 4, line 61, after "on" delete "B".

In column 5, line 17-23, after "(shown in FIG. 3A)." delete "Continuing with selection of the next row with only zeros (i.e., no ones), Module C can be subsequently selected. The resulting Dependency-Matrix 304 is depicted in FIG. 3C. FIG. 3D depicts the start-up sequences (B-C-D) and (B-C-A) as two potential start-up sequences that can be determined based on the Dependency-Matrix 300 (shown in FIG. 3A).".

In column 9, line 4, in claim 18, after "system" insert -- , --.

Signed and Sealed this
Nineteenth Day of April, 2011

David J. Kappos
*Director of the United States Patent and Trademark Office*